US008762679B2

(12) United States Patent
Kato et al.

(10) Patent No.: US 8,762,679 B2
(45) Date of Patent: *Jun. 24, 2014

(54) SYSTEMS AND METHODS OF ALLOCATING STORAGE REGIONS TO VIRTUAL REGIONS

(71) Applicant: Hitachi, Ltd., Tokyo (JP)

(72) Inventors: Tomoyuki Kato, Odawara (JP); Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,961

(22) Filed: Oct. 16, 2012

(65) Prior Publication Data

US 2013/0326187 A1 Dec. 5, 2013

Related U.S. Application Data

(63) Continuation of application No. 13/312,670, filed on Dec. 6, 2011, now Pat. No. 8,312,246, which is a continuation of application No. 12/702,933, filed on Feb. 9, 2010, now Pat. No. 8,086,818, which is a continuation of application No. 12/453,042, filed on Apr. 28, 2009, now Pat. No. 7,664,926, which is a continuation of application No. 11/439,138, filed on May 24, 2006, now Pat. No. 7,543,129.

(30) Foreign Application Priority Data

Mar. 29, 2006 (JP) .................................. 2006-092236

(51) Int. Cl.
G06F 12/08 (2006.01)
(52) U.S. Cl.
USPC ............................ 711/171; 711/114; 711/170

(58) Field of Classification Search
USPC .................................. 711/114, 170, 171, 203
See application file for complete search history.

(56) References Cited

U.S. PATENT DOCUMENTS 5,394,532 A 2/1995 Belsan
6,631,442 B1 10/2003 Blumenau
(Continued)

FOREIGN PATENT DOCUMENTS

EP 1 406 161 A2 6/2003
EP 1 406 161 A3 6/2003
(Continued)

OTHER PUBLICATIONS

Japan Patent Office action on application 2006-092236 mailed Jun. 21, 2011; pp. 1-3, with partial English-language translation.

(Continued)

Primary Examiner — John Lane
(74) Attorney, Agent, or Firm — Foley & Lardner LLP

(57) ABSTRACT

A storage system, method and program product, the system comprising: storage devices; and a controller configured to: provide virtual volumes to a host computer; manage logical units on the storage device and storage pools; allocate, in response to receiving a write request to a virtual volume, a storage region of the storage pools; and store data related to the write request in the storage region allocated, wherein the controller is further configured to: allocate first storage region in first storage pool to first virtual volume based on first size of the first storage region or the first virtual volume; allocate a second storage region in a second storage pool to a second virtual volume of the plurality of virtual volumes based on a second size of the second storage region or the second virtual volume.

15 Claims, 18 Drawing Sheets

(56) References Cited

U.S. PATENT DOCUMENTS

| | | |
|---|---|---|
| 6,785,744 B2 | 8/2004 | Fairclough et al. |
| 6,836,819 B2 | 12/2004 | Kano et al. |
| 6,874,061 B1 | 3/2005 | Bridge |
| 7,281,111 B1 | 10/2007 | Blumenau |
| 7,412,583 B2 | 8/2008 | Burton et al. |
| 2005/0182890 A1 | 8/2005 | Yamagami |
| 2005/0251508 A1 | 11/2005 | Shimizu |
| 2006/0107017 A1 | 5/2006 | Serizawa et al. |
| 2006/0277386 A1 | 12/2006 | Eguchi |
| 2007/0113041 A1 | 5/2007 | Sakashita et al. |
| 2007/0271429 A1 | 11/2007 | Eguchi et al. |

FOREIGN PATENT DOCUMENTS

| | | |
|---|---|---|
| EP | 1 538 518 A2 | 11/2004 |
| EP | 1 538 518 A3 | 11/2004 |
| JP | 07-134670 | 5/1995 |
| JP | 2003-015915 | 1/2003 |
| JP | 2005-011316 A | 1/2005 |
| JP | 2005-322020 | 11/2005 |

OTHER PUBLICATIONS

Japanese Office Action for JP 2006-092236, dated Jun. 21, 2011 with partial English translation.
The Extended European Search Report dated Mar. 5, 2009.

FIG.4

| VIRTUAL/LOGICAL VOLUME ADDRESS (41) | PHYSICAL/LOGICAL VOLUME IDENTIFICATION NUMBER (42) | PHYSICAL/LOGICAL VOLUME ADDRESS (43) |
|---|---|---|
| 0 | 0x0001 | 0 |
| 1 | 0x0001 | 1 |
| 2 | 0x0001 | 2 |
| 3 | 0x0001 | 3 |
| 4 | 0x0001 | 4 |
| 5 | 0x0001 | 5 |
| 6 | 0x0001 | 6 |
| 7 | 0x0001 | 7 |
| 8 | UNALLOCATED | UNALLOCATED |
| ⋮ | ⋮ | ⋮ |
| 127 | UNALLOCATED | UNALLOCATED |
| 128 | 0x0001 | 64 |
| 129 | 0x0001 | 65 |
| 130 | 0x0001 | 66 |
| 131 | 0x0001 | 67 |
| 132 | UNALLOCATED | UNALLOCATED |
| ⋮ | ⋮ | ⋮ |
| 1000 | UNALLOCATED | UNALLOCATED |
| 1001 | 0x0002 | 0 |
| 1002 | 0x0002 | 1 |
| 1003 | 0x0002 | 2 |
| 1004 | 0x0002 | 3 |
| 1005 | UNALLOCATED | UNALLOCATED |
| ⋮ | ⋮ | ⋮ |

| POOL AREA IDENTIFICATION NUMBER 51 | PHYSICAL/LOGICAL VOLUME IDENTIFICATION NUMBER 52 | EMULATION TYPE 53 | PHYSICAL/LOGICAL VOLUME SIZE 54 | ALLOCATION UNIT SIZE 55 | FREE STORAGE AREAS 56 |
|---|---|---|---|---|---|
| 0 | 0x0001 | OPEN-V | 300G | 1M | 307200 |
| 0 | 0x0002 | OPEN-V | 200G | 1M | 204800 |
| 1 | 0x0003 | 3390-3 | 300G | 1G | 300 |
| 1 | 0x0004 | 3390-3 | 1000G | 1G | 1000 |
| 1 | 0x0005 | 3390-3 | 5000G | 1G | 5000 |
| 2 | UNDEFINED | UNDEFINED | UNDEFINED | UNDEFINED | UNDEFINED |
| 3 | 0x0006 | OPEN-3 | 2000G | 10M | 2048000 |
| 4 | 0x0007 | OPEN-3 | 500G | 1M | 512000 |
| 4 | 0x0008 | OPEN-3 | 500G | 1M | 512000 |
| 5 | UNDEFINED | UNDEFINED | UNDEFINED | UNDEFINED | UNDEFINED |
| 6 | 0x00010 | OPEN-V | 500G | 1M | 512000 |
| 6 | 0x00011 | OPEN-V | 500G | 1M | 512000 |
| ------ | ------ | ------ | ------ | ------ | ------ |

| VIRTUAL/LOGICAL VOLUME IDENTIFICATION NUMBER 61 | POOL AREA IDENTIFICATION NUMBER 62 |
|---|---|
| 0x0100 | 0 |
| 0x0101 | 1 |
| 0x0103 | 3 |
| 0x0104 | 4 |
| 0x0106 | 6 |
| 0x0107 | 6 |
| UNUSED | UNUSED |
| ⋮ | ⋮ |

| 71 | 72 | 73 | 74 |
|---|---|---|---|
| VIRTUAL/LOGICAL VOLUME IDENTIFICATION NUMBER | EMULATION TYPE | LOGICAL VOLUME SIZE | CONNECTION PORT IDENTIFICATION NUMBER |
| 0x0001 | OPEN-V | 300G | UNCONNECTED |
| 0x0002 | OPEN-V | 200G | UNCONNECTED |
| 0x0003 | 3390-3 | 300G | UNCONNECTED |
| 0x0004 | 3390-3 | 1000G | UNCONNECTED |
| 0x0005 | 3390-3 | 5000G | UNCONNECTED |
| 0x0006 | OPEN-3 | 2000G | UNCONNECTED |
| 0x0007 | OPEN-3 | 500G | UNCONNECTED |
| 0x0008 | OPEN-3 | 500G | UNCONNECTED |
| 0x0009 | UNIMPLEMENTED | UNIMPLEMENTED | UNCONNECTED |
| ⋮ | ⋮ | ⋮ | ⋮ |
| 0x000a | UNIMPLEMENTED | UNIMPLEMENTED | UNCONNECTED |
| 0x0010 | OPEN-V | 500G | UNCONNECTED |
| 0x0011 | OPEN-V | 500G | UNCONNECTED |
| ⋮ | ⋮ | ⋮ | ⋮ |
| 0x0100 | OPEV-V | 500G | 1A |
| 0x0101 | 3390-3 | 1000G | 1B |
| 0x0102 | UNIMPLEMENTED | UNIMPLEMENTED | UNCONNECTED |
| 0x0103 | OPEN-3 | 500G | 1C |
| 0x0104 | OPEN-3 | 1000G | 1D |
| 0x0105 | UNIMPLEMENTED | UNIMPLEMENTED | UNCONNECTED |
| 0x0106 | OPEN-V | 300G | 1E |
| 0x0107 | OPEN-V | 700G | 1F |
| ⋮ | ⋮ | ⋮ | ⋮ |

70

PHYSICAL/LOGICAL VOLUME ADDRESS — STORAGE AREA ALLOCATION STATUS

0
1
2
3
4
5
6
7
8

63
64
65
66
67
68 n

| # | 0 | 1 | 2 | 3 | 4 | 5 | 6 | 7 | 8 | ---- | 63 | 64 | 65 | 66 | 67 | 68 | ---- | n |
|---|---|---|---|---|---|---|---|---|---|------|----|----|----|----|----|----|------|---|
|   | 1 | 1 | 1 | 1 | 1 | 1 | 1 | 1 | 0 | ---- | 0  | 1  | 1  | 1  | 1  | 0  | ---- | 0 |

Bit On(1):IN-USE
Bit Off(0):UNUSED

FIG.15

| VIRTUAL/ LOGICAL VOLUME ADDRESS | PHYSICAL/ LOGICAL VOLUME IDENTIFICATION NUMBER | PHYSICAL/ LOGICAL VOLUME ADDRESS | ALLOCATION UNIT SIZE |
|---|---|---|---|
| 0 | 0x0007 | 0 | 1M |
| 4 | 0x0007 | 4 | 1M |
| 8 | 0x0007 | 8 | 1M |
| 12 | 0x0006 | 0 | 10M |
| 52 | 0x0006 | 40 | 10M |
| 92 | 0x0007 | 12 | 1M |
| 96 | 0x0007 | 16 | 1M |
| 100 | 0x0007 | 20 | 1M |
| 104 | UNALLOCATED | UNALLOCATED | UNALLOCATED |
| ⋮ | ⋮ | ⋮ | ⋮ |
| n | UNALLOCATED | UNALLOCATED | UNALLOCATED |
| 1000 | 0x0006 | 80 | 10M |
| 1040 | 0x0006 | 120 | 10M |
| 1080 | 0x0008 | 0 | 1M |
| 1084 | 0x0008 | 40 | 1M |
| 1088 | UNALLOCATED | UNALLOCATED | UNALLOCATED |
| ⋮ | ⋮ | ⋮ | ⋮ |

SYSTEMS AND METHODS OF ALLOCATING STORAGE REGIONS TO VIRTUAL REGIONS

CROSS-REFERENCE TO RELATED PATENT APPLICATIONS

Japan Priority Application 2006-092236, filed Mar. 29, 2006 including the specification, drawings, claims and abstract, is incorporated herein by reference in its entirety. This application is a Continuation of U.S. application Ser. No. 13/312,670, filed Dec. 6, 2011, which is a Continuation of U.S. application Ser. No. 12/702,933, filed Feb. 9, 2010, now U.S. Pat. No. 8,086,818, which is a Continuation of U.S. application Ser. No. 12/453,042, filed Apr. 28, 2009, now U.S. Pat. No. 7,664,926, which is a Continuation of U.S. application Ser. No. 11/439,138, filed May 24, 2006, now U.S. Pat. No. 7,543,129. All of the aforesaid applications are incorporated herein by reference in their entirety as if fully set forth herein.

BACKGROUND OF THE INVENTION

The present invention is suited for use in a storage apparatus with a virtual/logical volume to which a dynamically variable storage area is allocated, the volume being provided to a host computer.

In recent years, storage apparatuses providing a host computer with storage areas for storing data have been able to include quite a large number of large-capacity disk drives, and the storage apparatus capacity has been expanding. This type of storage apparatus is operated so that: a disk array configured based on RAID (Redundant Array of Independent Disks) is generated from several disk devices; a plurality of so generated physical storage resources is then collected to make a physical/logical volume; and a storage area of a capacity needed by a host computer is taken out from that physical/logical volume to make a logical volume to be provided to the host computer.

Furthermore, another type of storage apparatus has recently been proposed where, instead of making a logical volume of a fixed capacity from a physical/logical volume, a host computer is initially provided with a virtually defined logical volume (hereinafter referred to as a virtual/logical volume), and, in response to the host computer's command, a dynamically variable storage area is allocated from a physical/logical volume (I.e., a physical resource) in particular units to that virtual/logical volume, thereby the storage capacity being dynamically expanded.

For example, JP Patent Laid-Open Publication No. 2003-015915 discloses a storage apparatus that provides each host computer with a corresponding virtual/logical volume made of a plurality of disk memory devices; obtains the read/write target logical block address from a command from the host computer directed to the virtual/logical volume; and if the virtual/logical volume has no storage area associated with the logical block address that has been specified by the command, allocates a storage area from unused magnetic disk memory devices so that the storage area for the virtual/logical volume is dynamically expanded.

However, the above storage apparatus disclosed by JP Patent Laid-Open Publication No. 2003-015915 is configured to allocate a storage area to the virtual/logical volume in predetermined fixed units of allocation. So, if the fixed allocation unit size for the storage area for storing data sent from the host computer is large, that large portion of the storage area will be allocated even when a small piece of data is sent from the host computer, resulting in lower storage area operation efficiency.

On the other hand, in the storage apparatus disclosed by JP Patent Laid-Open Publication No. 2003-015915, the fixed allocation unit size for the storage area for storing data sent from the host computer is small, it is necessary to increase the number of management bits for managing the storage area allocated, and huge memory capacity is required to maintain those management bits.

SUMMARY OF THE INVENTION

Considering the above, the present invention aims at proposing a storage apparatus and a storage area allocation method that can greatly improve storage area operation efficiency.

In order to solve the above-described problems, the present invention provides a storage apparatus provided with a storage area for storing data sent from a host computer, and a virtual/logical volume to which a dynamically variable storage area is allocated from within the storage area, the volume being provided to the host computer, and the storage apparatus including: a pool area generation unit for generating a plurality of pool areas, each composed from the storage area; a setting unit for setting for each of the plurality of pool areas generated by the pool area generation unit, an allocation unit size for allocating a storage area from within the storage area provided by the pool area to the virtual/logical volume; a selecting unit for selecting, when data to be stored in the storage area is sent from the host computer, a pool area from among the plurality of pool areas having the allocation unit size set by the setting unit, in accordance with the size of the sent data; and an allocation unit for allocating a storage area from within the storage area provided by the pool area selected by the selecting unit to the virtual/logical volume.

Accordingly, it is possible to effectively prevent storage area(s) from being allocated to data sent from the host computer, in units of allocation too large or too small relative to that data size, and allocate a storage area of an appropriate allocation unit size to that data.

The present invention also provides a storage area allocation method for a storage apparatus provided with a storage area for storing data sent from a host computer, and a virtual/logical volume to which a dynamically variable storage area is allocated from within the storage area, the volume being provided to the host computer, and the storage area allocation method including: a first step of generating a plurality of pool areas, each composed from the storage area; a second step of setting for each of the plurality of pool areas generated in the first step, an allocation unit size for allocating a storage area from within the storage area provided by the pool area to the virtual/logical volume; a third step of, when data to be stored in the storage area is sent from the host computer, selecting a pool area from among the plurality of pool areas having the allocation unit size set in the second step, in accordance with the size of the sent data; and a fourth step of allocating a storage area from within the storage area provided by the pool area selected in the third step to the virtual/logical volume.

Accordingly, it is possible to effectively prevent storage area(s) from being allocated to data sent from the host computer, in units of allocation too large or too small relative to that data size, and allocate a storage area of an appropriate allocation unit size to that data.

According to the present invention, by generating a plurality of pool areas, each composed from a storage area; setting for each of the plurality of pool areas, an allocation unit size for allocating a storage area from within the storage area provided by the pool area to the virtual/logical volume; selecting, when data to be stored in the storage area is sent from the host computer, one pool area from among the plurality of pool areas in accordance with the size of the sent data; and allocating a storage area from within the storage area provided by that selected pool area to the virtual/logical volume, it is possible to effectively prevent storage area(s) from being allocated to data sent from the host computer, in units of allocation too large or too small relative to that data size, and allocate a storage area of an appropriate allocation unit size to that data. As a result, a storage apparatus and a storage area allocation method that can greatly improve storage area operation efficiency can be achieved.

BRIEF DESCRIPTION OF THE DRAWINGS

FIG. 4 is a schematic view for explaining a mapping table;

FIG. 5 is a schematic view for explaining a pool area management table;

FIG. 6 is a schematic view for explaining a virtual/logical volume management table;

FIG. 7 is a schematic view for explaining a logical volume configuration table;

FIG. 15 is a schematic view for explaining a mapping table;

DETAILED DESCRIPTION OF THE INVENTION

Embodiments of this invention are described below in detail with reference to the attached drawings.

Figure 1:
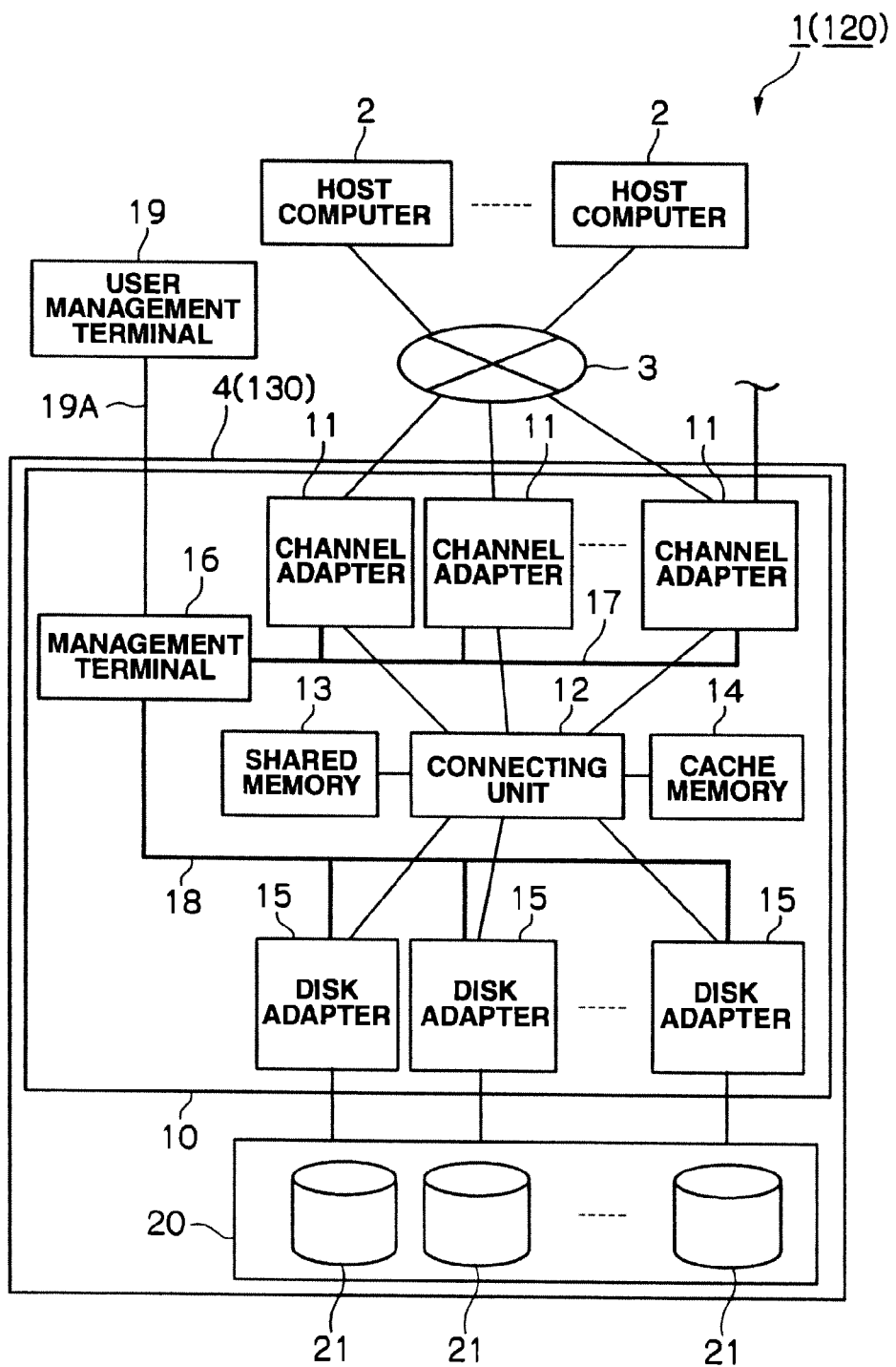
FIG. 1 briefly shows the storage system configuration according to embodiments of the invention.

(1) First Embodiment (1-1) Storage system configuration according to a first embodiment FIG. 1 shows the configuration of a storage system 1 according to a first embodiment. The storage system 1 is configured to include a plurality of host computers 2 connected to a storage apparatus 4 via a network 3.

The host computers 2, each as a host system, are computer devices equipped with a CPU (Central Processing Unit), memory and other information processing resources, and they are configured to be, for example, personal computers, workstations, mainframe computers, or similar. Each host computer 2 has data input devices, such as a keyboard, switch, pointing device, or microphone (not shown in the drawing), and data output devices, such as a monitor display or speaker (not shown in the drawing).

The network 3 is configured to be, for example, a SAN (Storage Area Network), LAN (Local Area Network), internet, public line, dedicated line, or similar. Communication between the host computers 2 and the storage apparatus 4 via the network 3 is performed in accordance with, for example, Fibre Channel Protocol if the network 3 is a SAN, and TCP/IP (Transmission Control Protocol/Internet Protocol) if the network 3 is a LAN.

The storage apparatus 4 is configured to have a control unit 10 for controlling data input/output, and a storage device unit 20 constituted by a plurality of disk devices 21 for storing data.

The control unit 10 is configured to have a plurality of channel adapters 11, a connecting unit 12, shared memory 13, cache memory 14, a plurality of disk adapters 15 and a management terminal 16.

Each channel adapter 11 is configured as a microcomputer system including a microprocessor, memory, a communication interface, etc., and has a port for connection with the network 3, another storage apparatus, or similar. Each channel adapter 11 interprets various commands sent from the host computers 2 via the network 3 and executes the corresponding processing. The port of each channel adapter 11 is assigned a network address (for example, an IP address or WWN) for identifying themselves, whereby each channel adapter 11 can individually behave as a NAS (Network Attached Storage).

The connecting unit 12 is connected with each channel adapter 11, shared memory 13, cache memory 14 and each disk adapter 15. Data and commands are transmitted via the connecting unit 12 to and from each channel adapter 11, shared memory 13, cache memory 14 and each disk adapter 15. The connecting unit 12 is configured to be, for example, a switch, such as an ultra-high-speed cross-bus switch that executes data transmission by high-speed switching; a bus; or similar.

The shared memory 13 and the cache memory 14 are storage memory shared by the channel adapters 11 and the disk adapters 15. The shared memory 13 is used to store various pieces of system configuration information about the entire configuration of the storage apparatus 4, and various programs and tables, and it is also used to store various commands including write/read request commands. Various programs and tables stored in the shared memory 13 in this embodiment are explained later. The cache memory 14 is mainly used to temporarily store write/read target data to be input/output to/from the storage apparatus 4.

Each disk adapter 15 is configured as a microcomputer system including a microprocessor, memory, etc., and functions as an interface for performing protocol control during communication with the disk devices 21 within the storage device unit 20. The disk adapters 15 are connected with their corresponding disk devices 21 in the storage device unit 20, for example, via a Fibre Channel cable, and transmit data to/from those disk devices 21 in accordance with Fibre Channel Protocol.

The management terminal 16 is a terminal device that controls the overall operation of the storage apparatus 4, and it is configured to be, for example, a notebook computer. The management terminal 16 is connected with each channel adapter 11 via a LAN 17, and also connected with each disk adapter 15 via a LAN 18. An operator can define system configuration information using the management terminal 16, and can also store the defined system configuration information in the shared memory 13 via the channel adapters 11 or disk adapters 15 and then via the connecting unit 12, A user management terminal 19 is a computer system whereby a user manages the storage apparatus 4 with respect to its status, any change in its configuration, or similar. The user management terminal 19 is connected with the management terminal 16 via a communication network 19A, and it obtains various information indicating the control status of the storage apparatus 4 through the management terminal 16, and gives various instructions to the storage apparatus 4 via the management terminal 16.

Examples of the disk devices 21 in the storage device unit 20 include expensive disks, such as SCSI (Small Computer System Interface) disks, and inexpensive disks, such as SATA (Serial AT Attachment) disks and optical disks.

Each disk device 21 in the storage device unit 20 is operated by the control unit 10 based on RAID. In a physical storage area provided by one or more disk devices 21, one or more logical volumes (hereinafter referred to as physical/logical volume(s)) are established. Data is stored in the physical/logical volume(s) in blocks of a predetermined size (hereinafter referred to as logical block(s)).

Each logical volume is given its own unique identifier (hereinafter referred to as an LUN (Logical Unit Number)). In this embodiment, an LUN, together with the unique number given to each logical block (LBA: Logical Block Address), constitutes an address, and data input/output is performed designating a specific address of that type.

(1-2) Storage area allocation processing in the first embodiment

Figure 2:
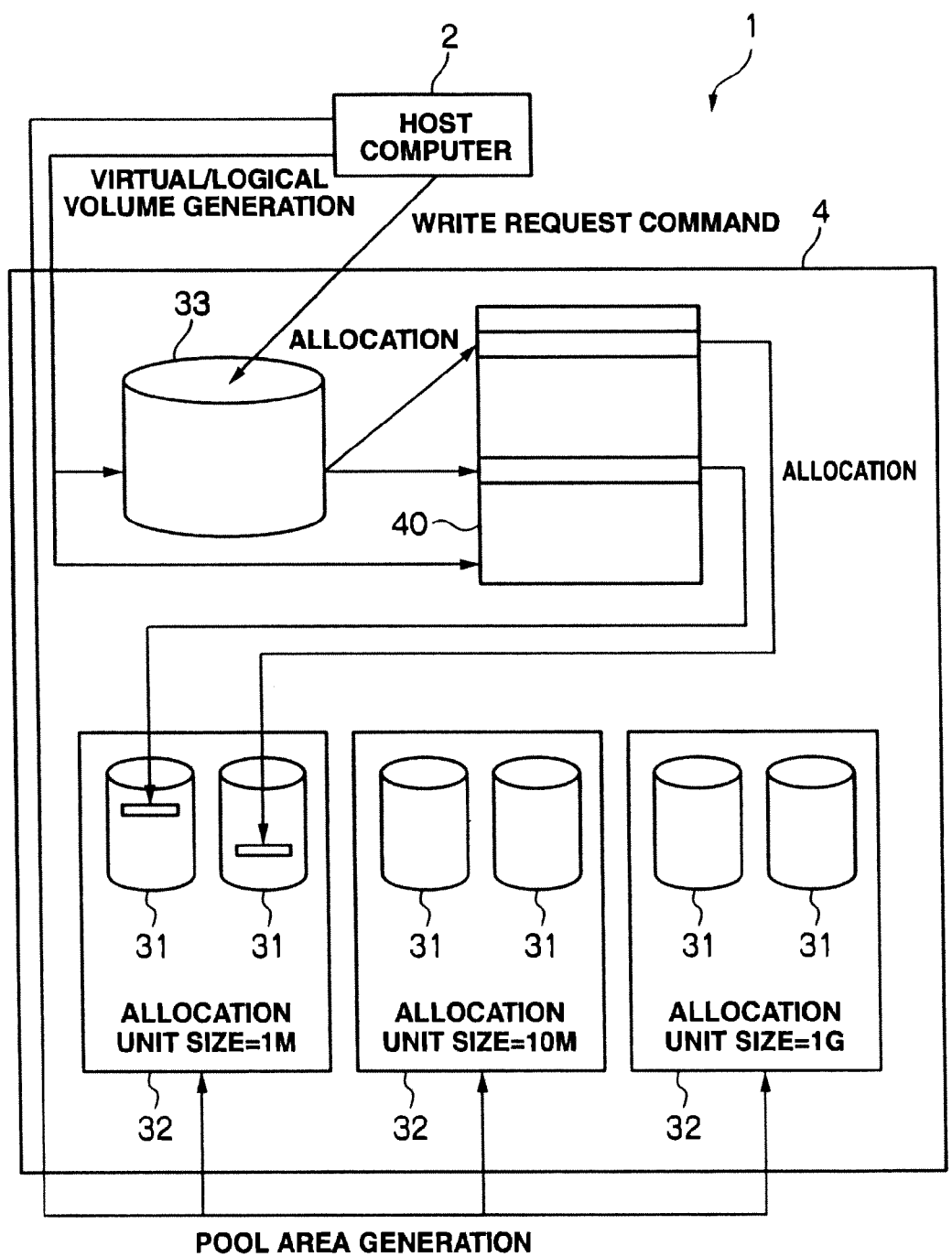
FIG. 2 is a schematic view briefly illustrating the content of allocation processing according to a first embodiment of the invention.

Referring next to FIGS. 2 through 12, allocation processing for allocating a storage area to a virtual/logical volume in the storage apparatus 4 in the storage system 1 according to this embodiment will be explained. FIG. 2 is a schematic view briefly illustrating the content of the allocation processing.

In this embodiment, the storage apparatus 4 has physical/logical volumes 31 and virtual/logical volumes 33. Each physical/logical volume 31 is a volume for storing data transmitted from a host computer 2, and each virtual/logical volume 33 is a volume to which a dynamically variable storage area is allocated from within the storage area provided by the physical/logical volumes 31 with reference to a mapping table 40, the volume being provided to the host computer 2.

The storage apparatus 4 generates a plurality of pool areas 32 for holding physical/logical volumes 31, and sets, for each pool area 32, an allocation unit size for allocating a storage area from within the storage area provided by the physical/logical volumes 31 in the pool area 32 to a virtual/logical volume 33. Also, when data is transmitted from the host computer 2, the storage apparatus 4 selects, from among the plurality of pool areas 32, the specific pool area associated with the virtual/logical volume 33, and allocates a storage area from within that provided by the physical/logical volumes 31 in the selected pool area 32 to that virtual/logical volume 33. This is one of the features of this embodiment, and further details are explained later.

Figure 3:
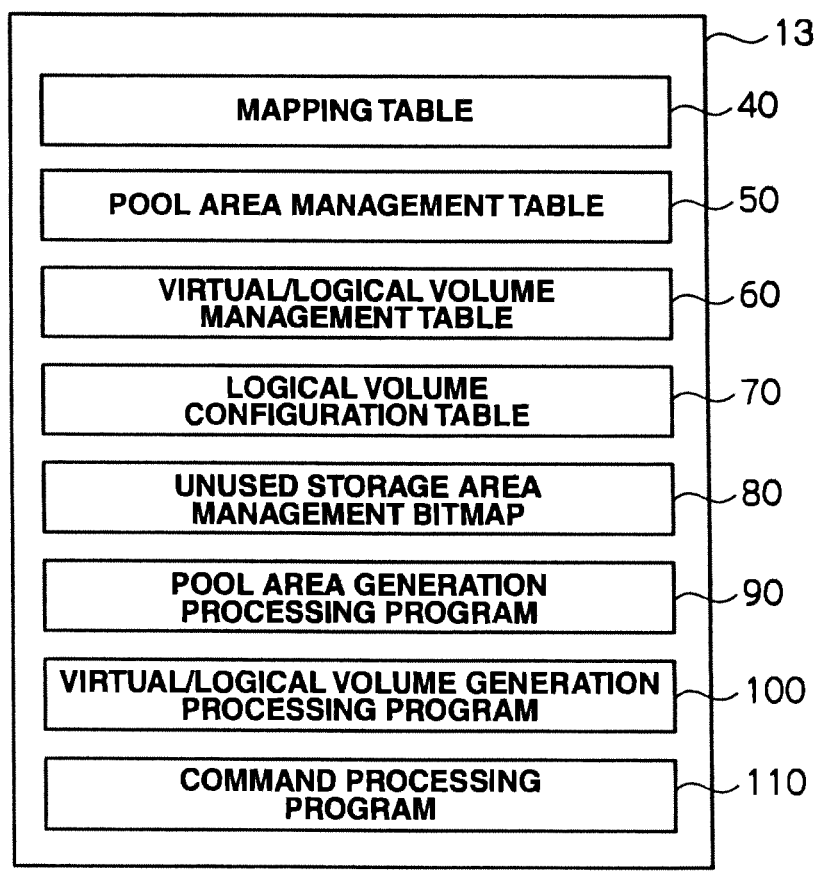
FIG. 3 is a schematic view for explaining various tables and programs in shared memory.

FIG. 3 illustrates various programs and tables that are stored in the shared memory 13 and related to the storage area allocation processing according to this embodiment. In this embodiment, the shared memory 13 stores: a mapping table 40; pool area management table 50; virtual/logical volume management table 60; logical volume configuration table 70; unused storage area management bitmap 80; pool area generation processing program 90; virtual/logical volume generation processing program 100; and command processing program 110. Details of the pool area generation processing program 90, virtual/logical volume generation processing program 100 and command processing 110 are explained later.

FIG. 4 shows the configuration of the mapping table 40. The mapping table 40 is generated and managed for each virtual/logical volume 33, and holds the correlation between that virtual/logical volume 33 and the physical/logical volume(s) 31. This table is composed of: a virtual/logical volume address field 41; physical/logical volume identification number field 42; and physical/logical volume address field 43.

The virtual/logical volume address field 41 manages the address (e.g. LBA) in the virtual/logical volume 33. The physical/logical volume identification number field 42 manages the identification number (e.g. LUN) of a physical/logical volume 31 associated with the above virtual/logical volume 33 address. The physical/logical volume address field 43 manages the address (e.g. LBA) in the physical/logical volume 31, associated with the above virtual/logical volume 33 address.

In FIG. 4, for example, the virtual/logical volume address "0" is associated with the physical/logical volume address "0" in the physical/logical volume 31 having the physical/logical volume identification number "0x0001."

FIG. 5 shows the configuration of the pool area management table 50. The pool area management table 50 is a table for holding the correlation between the pool areas 32 and the physical/logical volumes 31, and is composed of: a pool area identification number field 51; physical/logical volume identification number field 52; emulation type field 53; physical/logical volume size field 54; allocation unit size field 55; and unused storage areas field 56.

The pool area identification number field 51 manages the identification number of each pool area 32. The physical/logical volume identification number field 52 manages the identification number of a physical/logical volume 31 held in the pool area 32.

The emulation type field 53 manages the type of emulation for the host computer 2 that has sent the data to be stored in the physical/logical volume 31. Here, "emulation" means executing a software program developed for particular hardware on other hardware with a different configuration. For example, if "OPEN-V" is stored in the emulation type field 53, that shows that the storage apparatus 4 has executed "OPEN-V" type software and stored "OPEN-V" emulation type data sent from the host computer 2. For example, "OPEN-V" and "OPEN-3" are emulation types for a so-called open-type computer system, such as a Windows® system, and the "3390-3" is for a so-called mainframe-type computer system.

The physical/logical volume size field 54 manages the size of the physical/logical volume 31. The allocation unit size field 55 manages the allocation unit size for allocating a storage area from within that provided by the physical/logical volume 31 in the pool area 32 to a virtual/logical volume 33. The unused storage areas field 56 manages the number of unused areas in the storage area, calculated by dividing the size of the physical/logical volume 31 by the allocation unit size for the storage area and then subtracting from the resulting number the used areas.

As shown in FIG. 2, each pool area 32 can hold several physical/logical volumes 31 if data stored in the physical/logical volumes 31 is transmitted from the host computers 2 with the same emulation slot type and if the physical/logical volumes 31 have the same allocation unit size.

In FIG. 5, for example, the pool area 32 having the pool area identification number "0" holds a physical/logical volume 31 having an emulation type of "OPEN-V," physical/logical volume size of "300 G(300 GB)", "307200" unused storage areas, and physical/logical volume identification number of "0x0001," and another physical/logical volume 31 having an emulation type of "OPEN-V," physical/logical volume size of "200 G," "204800" unused storage areas, and physical/logical volume identification number of "0x0002." Also, a "1 M (1 MB)" allocation unit size is established for the above pool area 32.

FIG. 6 shows the configuration of the virtual/logical volume management table 60. The virtual/logical volume management table 60 is a table for holding the correlation between the virtual/logical volumes 33 and the pool areas 32, and is composed of a virtual/logical volume identification number field 61 and a pool area identification number field 62.

The virtual/logical volume identification number field 61 manages the identification number (e.g. LUN) of a virtual/logical volume 33. The pool area identification number 62 manages the identification number of a pool area 32, which has been selected by a user and associated with the virtual/logical volume 33 identification number.

In FIG. 6, for example, the virtual/logical volume 33 having the virtual/logical volume identification number "0x0100" is associated with the pool area 32 having the pool area identification number "0".

FIG. 7 shows the configuration of the logical volume configuration table 70. The logical volume configuration table 70 is a table for holding the respective configurations of the physical/logical volumes 31 and virtual/logical volumes 33, and their correlation with the host computers 2. This table is composed of: a logical volume identification number field 71; emulation type field 72; logical volume size field 73; and connection port identification number field 74.

The logical volume identification number field 71 manages the identification number (e.g. LUN) of a physical/logical volume 31 or virtual/logical volume 33. The emulation type field 72 manages the type of emulation for the host computer 2 that has sent the data to be stored in the physical/logical volume 31 or virtual/logical volume 33. The logical volume size field 54 manages the size of the physical/logical volume 31 or virtual/logical volume 33. The connection port identification number field 74 manages the connection port for connection with the host computer 2.

In FIG. 7, for example, the virtual/logical volume 33 having the logical volume identification number "0x0100" has the emulation type "OPEN-V", logical volume size of "500 G," and connection port "1A."

Figures 8, 9:
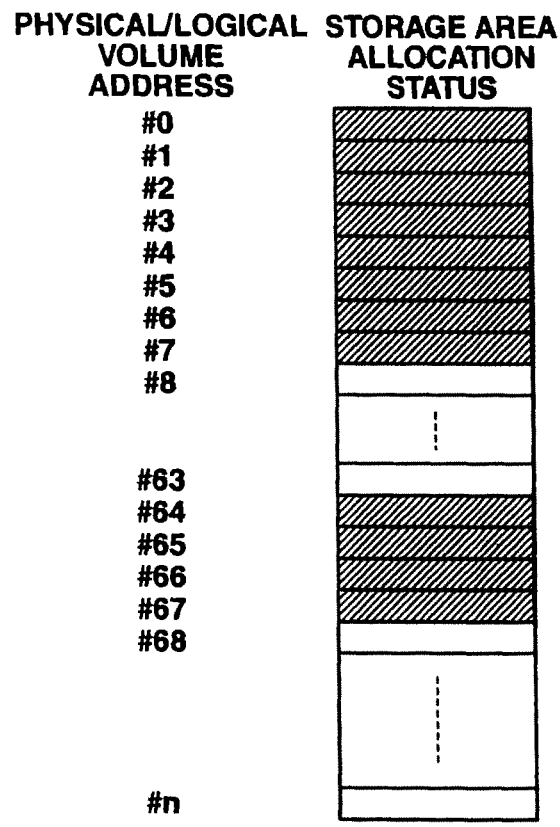
FIG. 8 is a schematic view briefly illustrating the storage area allocation status in an unused storage area management bitmap.
FIG. 9 is a schematic view for explaining the storage area allocation status in an unused storage area management bitmap.

FIG. 8 is a schematic view briefly illustrating the unused storage area management bitmap 80. An unused storage area management bitmap 80 is prepared for each physical/logical volume 31, managing whether the physical/logical volume addresses in the physical/logical volume 31 have been allocated to a virtual/logical volume 33 or not. In the unused storage area management bitmap 80 shown in FIG. 8, a shaded portion of the storage area shows that the corresponding physical/logical volume address has been allocated to a virtual/logical volume 33, and a non-shaded portion of the storage area shows that the corresponding physical/logical volume address has not been allocated to any virtual/logical volume 33.

FIG. 9 shows the unused storage area management bitmap 80 in actual operation. The unused storage area management bitmap 80, in actual operation, manages the shaded portions of the storage area in FIG. 8, whose corresponding physical/logical volume addresses have been allocated to a virtual/logical volume 33, as "Bit On (1)" showing being "in-use," and the non-shaded portions of the storage area in FIG. 8, whose corresponding physical/logical volume addresses have not been allocated to a virtual/logical volume 33, as "Bit Off (0)" showing being "unused."

Figure 10:
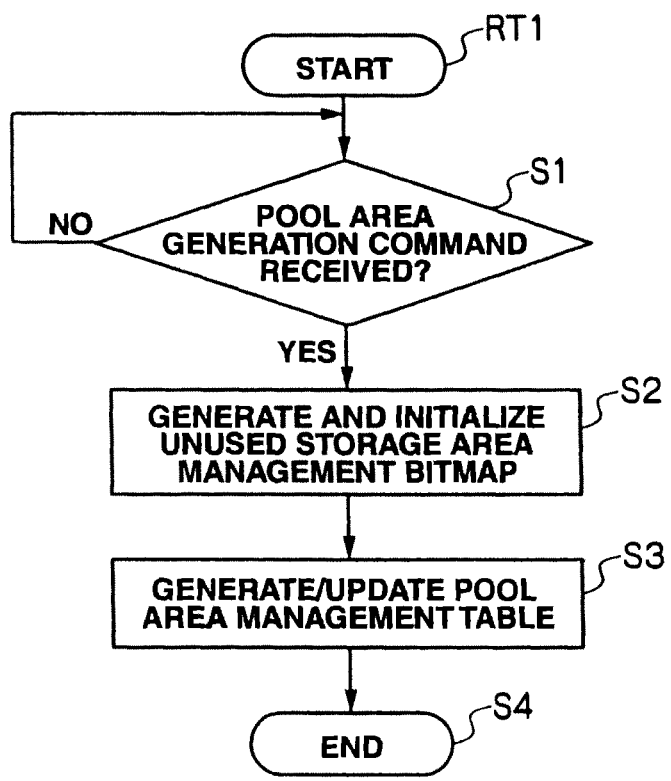
FIG. 10 is a flowchart for explaining pool area generation processing.

Next, pool area generation processing in the storage system 1 according to the first embodiment will be explained. FIG. 10 is a flowchart showing the specific procedure executed by the storage apparatus 4 for the pool area generation processing in the storage system 1.

Upon system boot-up, a channel adapter 11 in the storage apparatus 4 executes the pool area generation processing program 90 for generating a pool area 32 for holding physical/logical volumes 31, and, in accordance with the pool area generation procedure RT1 shown in FIG. 10, waits in standby mode to receive a pool area generation command via the management terminal 16 from a user at the user management terminal 19 (S1).

A pool area generation command, for example, includes information specified by a user, such as the pool area identification number of a pool area 32 to be generated, and the allocation unit size for allocating a storage area from within that provided by the physical/logical volumes 31 in the generated pool area 32 to a virtual/logical volume 33, and also the configuration information (physical/logical volume identification number, emulation type, and physical/logical volume size) regarding the physical/logical volumes 31 held in the generated pool area 32, which is obtained and specified by referring in advance to the physical/logical volumes 31 in the logical volume configuration table 70 shown in FIG. 7.

When the channel adapter 11 receives a pool area generation command from the user management terminal 19 via the management terminal 16 (S1: YES), it generates and initializes an unused storage area management bitmap 80 (S2).

More specifically, according to the received pool area generation command, the channel adapter 11 generates an unused storage area management bitmap 80 for every physical/logical volume 31 specified by the user, and updates the unused storage area management bitmap 80 by setting "1" for the management status of a physical/logical volume address whose corresponding storage area already has data stored therein, and setting "0" for the management status of a physical/logical volume address whose corresponding storage area has no data stored therein.

The channel adapter 11 then generates, or updates, a pool area management table 50, in accordance with the pool area generation command received from the user management terminal 19 via the management terminal 16 "(S3).

More specifically, if no pool area management table 50 has yet been generated, the channel adapter 11 generates a pool area management table 50, and, according to the pool area generation command, stores the configuration information regarding the physical/logical volumes 31, the pool area identification number and allocation unit size, which have been specified by the user, in the corresponding fields of the pool area management table 50. Also, based on the physical/logical volume size and the allocation unit size, and the unused storage area management bitmap 80, the channel adapter 11 calculates the unused storage areas for each physical/logical volume 31, and stores the resulting value in the corresponding field of the pool area management table 50.

If a pool area management table 50 has already been generated, the channel adapter 11 updates the pool area management table 50 by storing, according to the pool area generation command, the configuration information regarding the physical/logical volumes 31, the pool area identification number and allocation unit size, which have been specified by the user, in the corresponding fields of the pool area management table 50, and also by calculating the unused storage areas for each physical/logical volume 31, based on the physical/logical volume size and the allocation unit size, and the unused storage area management bitmap 80, and storing the resulting value in the corresponding field of the pool area management table 50.

The channel adapter 11 thereafter ends the pool area generation procedure RT1 shown in FIG. 10 (S4).

Figure 11:
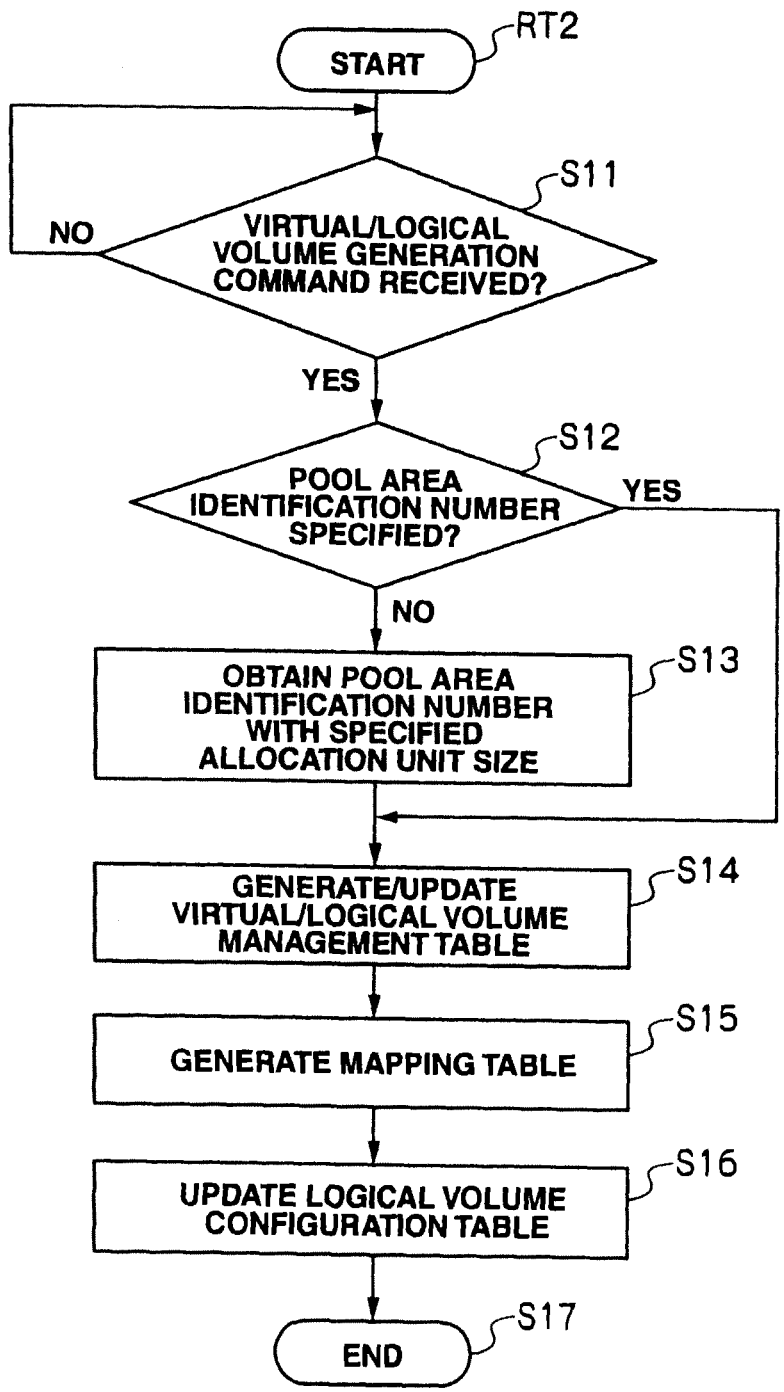
FIG. 11 is a flowchart for explaining virtual/logical volume generation processing.

Next, virtual/logical volume generation processing in the storage system 1 according to the first embodiment will be explained. FIG. 11 is a flowchart illustrating the specific procedure executed by the storage apparatus 4 for the virtual/logical volume generation processing in this storage system 1.

Upon system boot-up, a channel adapter 11 executes the virtual/logical volume generation processing program 100 for generating a virtual/logical volume 33, and, in accordance with the virtual/logical volume generation procedure RT2 shown in FIG. 11, waits in standby mode to receive a virtual/logical volume generation command via the management terminal 16 from a user at the user management terminal 19 (S11).

A virtual/logical volume generation command, for example, includes information, such as: the virtual/logical volume identification number of a virtual/logical volume 33 to be generated; the virtual/logical volume size of the virtual/logical volume 33 to be generated; the connection port for connecting the virtual/logical volume 33 to be generated to the host computer 2; the pool area identification number of the pool area to be associated with the virtual/logical volume 33 to be generated; and the allocation unit size for when a storage area is to be allocated to the virtual/logical volume 33 to be generated, all specified by a user.

When the channel adapter 11 receives a virtual/logical volume generation command via the management terminal 16 from a user at the user management terminal 19 (S11: YES), the channel adapter 11 checks whether the virtual/logical volume generation command specifies a pool area identification number (S12).

If the virtual/logical volume generation command does not specify a pool area identification number (S12: NO), the channel adapter 11 obtains a pool area identification number with the specified allocation unit size (S13).

More specifically, for example, if the virtual/logical volume generation command specifies an allocation unit size of "1 M," the channel adapter 11 refers to the pool area management table 50, and obtains the pool area identification number "0," whose corresponding allocation unit size field 55 stores "1 M."

Here, if the allocation unit size specified by the virtual/logical volume generation command is not managed in the pool area management table 50, the channel adapter 11 obtains the pool area identification number having the allocation unit size closest to the specified size.

Meanwhile, if the virtual/logical volume generation command specifies a pool area identification number (S12: YES), or if the channel adapter 11 has obtained a pool area identification number with the specified allocation unit size (S13), the channel adapter 11 generates, or updates, a virtual/logical volume management table 60, in accordance with the virtual/logical volume generation command received from the host computer 2 (S14).

More specifically, if no virtual/logical volume management table 60 has yet been generated, the channel adapter 11 generates a virtual/logical volume management table 60, and, according to the virtual/logical volume generation command, stores the virtual/logical volume identification number specified by the user, and the pool area identification number specified by the user or obtained from the pool area management table, in the corresponding fields of the virtual/logical volume management table 60.

If a virtual/logical volume management table 60 has already been generated, the channel adapter 11 updates the virtual/logical volume management table 60 by storing, according to the virtual/logical volume generation command, the virtual/logical volume identification number specified by the user, and the pool area identification number specified by the user or obtained from the pool area management table, in the corresponding fields of the virtual/logical volume management table 60.

Accordingly, using the above virtual/logical volume management table 60, the channel adapter 11 can select, from among a plurality of pool areas 32, the specific pool area for a virtual/logical volume 33, the pool area holding a physical/logical volume 31 from which a storage area is to be allocated to the virtual/logical volume 33.

The channel adapter 11 then generates a mapping table 40 in accordance with the pool area generation command received from the user management terminal 19 via the management terminal 16 (S15). More specifically, the channel adapter 11 generates a mapping table 40 for each generated virtual/logical volume 33, and, in accordance with the virtual/logical volume generation command, stores the virtual/logical volume addresses corresponding to the virtual/logical volume size specified by the user, in the corresponding fields of the mapping table 40.

Then, the channel adapter 11 updates the logical volume configuration table 70 in accordance with the pool area generation command received from the user management terminal 19 via the management terminal 16 (S16). More specifically, the channel adapter 11 stores, in accordance with the virtual/logical volume generation command, the virtual/logical volume identification number (logical volume identification number), virtual/logical volume size (logical volume size) and connection port, which have been specified by the user, in the corresponding fields of the logical volume configuration table 70. The channel adapter 11 also refers to the virtual/logical volume management table 60, finds the pool area identification number associated with the above virtual/logical volume identification number, and then stores the emulation type for that pool area identification number in the corresponding field of the logical volume configuration table 70.

The channel adapter 11 thereafter ends the virtual/logical volume generation procedure RT2 shown in FIG. 11 (S17).

Figure 12:
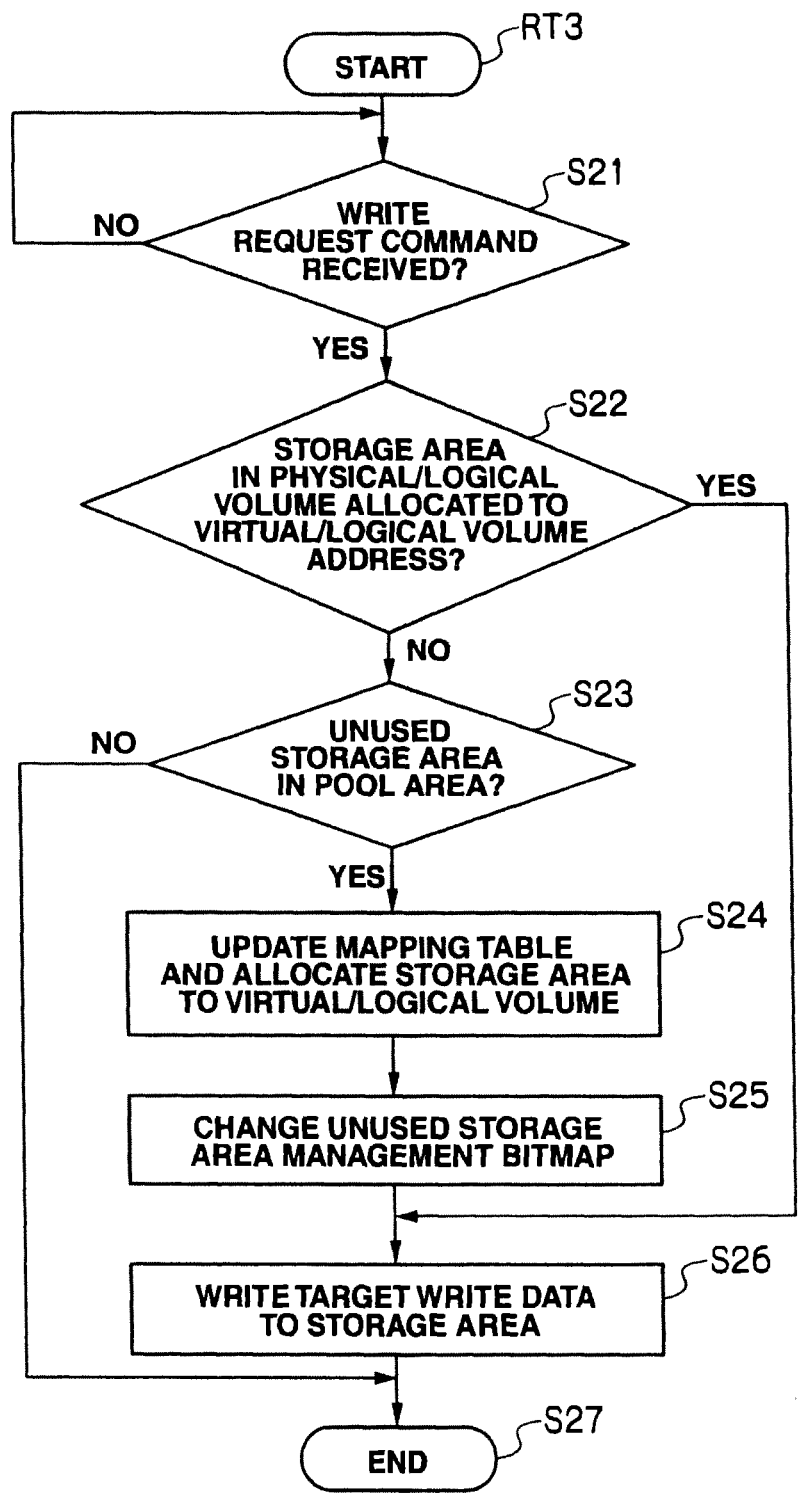
FIG. 12 is a flowchart for explaining command processing for data write.

Next, command processing in response to a data write request in the storage system 1 according to the first embodiment will be explained. FIG. 12 is a flowchart describing the specific procedure executed by the storage apparatus 4 for the command processing in response to a data write request in the storage system 1.

Upon system boot-up, a channel adapter 11 executes the command processing program 110 for writing data to a storage area in response to a data write request command received from the host computer 2, and, in accordance with the data write request command procedure RT3 shown in FIG. 12, waits in standby mode to receive a data write request command from a user at the host computer 2 (S21).

When the channel adapter 11 receives a data write request command from a host computer 2 (S21: YES), the channel adapter 11 checks whether a storage area in a physical/logical volume 31 has been allocated to the virtual/logical volume address in the virtual/logical volume 33 (S22).

More specifically, the channel adapter 11 refers to the mapping table 40, and checks whether the virtual/logical volume address, to which the write target data included in the received data write request command is to be written, is associated with a physical/logical volume identification number and a physical/logical volume address.

Then, if no storage area in a physical/logical volume 31 has been allocated to the virtual/logical volume address in the virtual/logical volume 33 (S22: NO), the channel adapter 11 checks whether the physical/logical volumes 31 in the pool area 32 associated with that virtual/logical volume 33 have any unused storage areas or not (S23).

More specifically, the channel adapter 11 refers to the virtual/logical volume management table 60 to obtain the pool area identification number associated with that virtual/logical volume identification number, and then refers to the pool area management table 50 to check whether any unused storage areas are stored in the relevant field associated with the above-obtained pool area identification number.

If the physical/logical volumes 31 in the pool area 32 associated with the virtual/logical volume 33 have no unused storage area (S23: NO), the channel adapter 11 closes the physical/logical volumes 31 in that pool area 32, and then ends the data write request command procedure RT3 shown in FIG. 12 (S27).

Meanwhile, if the physical/logical volumes 31 in the pool area 32 associated with that virtual/logical volume 33 have any unused storage area (S23: YES), the channel adapter 11 updates the mapping table 40 and allocates a storage area from within that provided by the physical/logical volumes 31 in the pool area 32 associated with the virtual/logical volume 33 (S24).

More specifically, the channel adapter 11 refers to the unused storage area management bitmap 80 to determine the starting physical/logical volume address of a storage area to be allocated, and then refers to the mapping table 40 and updates it by storing the physical/logical volume identification number and the physical/logical volume address of the storage area to be allocated in the physical/logical volume 31, respectively in the relevant fields associated with the target virtual/logical volume address in the mapping table 40.

In the above, the channel adapter 11 is configured to allocate, if several physical/logical volumes have unused storage areas, a storage area from within that provided by the physical/logical volume 31 having the largest unused storage areas.

The channel adapter 11 next changes the unused storage area management bitmap 80 in connection with the update of the mapping table 40 (S25). More specifically, the channel adapter 11 refers to the mapping table 40, and changes the unused storage area management bitmap 80 by changing the management status of the physical/logical volume address of the allocated storage area in the physical/logical volume 31 to "1" in the unused storage area management bitmap 80.

Meanwhile, if a storage area in a physical/logical volume 31 has already been allocated to the virtual/logical volume address in the virtual/logical volume 33 (S22: YES), or if the channel adapter 11 has allocated a storage area to the virtual/logical volume 33, updated the mapping table 40 and changed the unused storage area management bitmap 80 (S24, S25), the channel adapter 11 writes the write target data in the storage area in the physical/logical volume 31, which is associated with the write target virtual/logical volume address (S26).

The channel adapter 11 thereafter ends the data write request command procedure RT3 shown in FIG. 12 (S27).

As explained above, in the storage system 1, a plurality of pool areas 32 is generated for holding physical/logical volumes 31, and an allocation unit size is set for each pool area 32, the allocation unit size being used for allocating a storage area from within that provided by the physical/logical volumes 31 in the pool area 32 to a virtual/logical volume 33. When data is transmitted from the host computer 2, the specific pool area associated with the virtual/logical volume 33 is selected from among the plurality of pool areas 32, and a storage area from within that provided by the physical/logical volumes 31 in the selected pool area 32 is allocated to that virtual/logical volume 33.

Accordingly, in the storage system 1, it is possible to effectively prevent storage area(s) from being allocated to data sent from the host computer, in units of allocation too large or too small relative to that data size, and allocate a storage area of an appropriate allocation unit size to that data. As a result, the efficient operation of the physical/logical volume storage area can be achieved.

(2) Second Embodiment

A storage system 120 according to a second embodiment has almost the same configuration as the storage system 1 according to the first embodiment, except that: it has a mapping table 40 with a different configuration; it includes a virtual/logical volume generation processing program 100 and command processing 110 with different content; and it has no virtual/logical volume management table 60.

Figure 13:
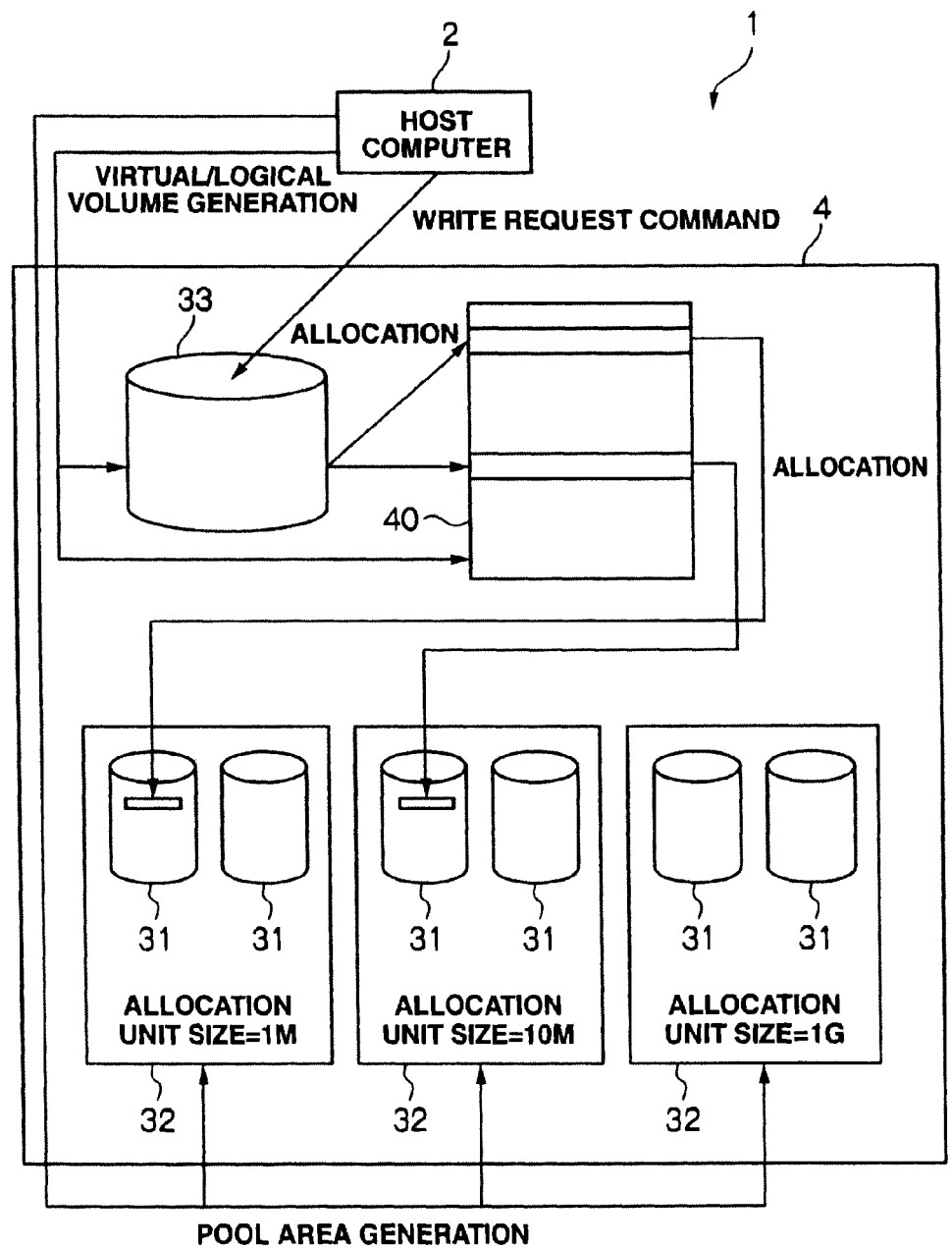
FIG. 13 is a schematic view briefly illustrating the content of allocation processing according to a second embodiment.

Allocation processing for allocating a storage area to a virtual/logical volume in the storage apparatus 130 in the storage system 120 according to this embodiment will be explained below with reference to FIGS. 13 to 17. FIG. 13 is a schematic view briefly illustrating the content of that allocation processing.

in this embodiment, the storage apparatus 130 generates a plurality of pool areas 32 for holding physical/logical volumes 31, and sets, for each pool area 32, an allocation unit size for allocating a storage area from within the storage area provided by the physical/logical volumes 31 in the pool area 32 to a virtual/logical volume 33. When data is transmitted from the host computer 2, the storage apparatus 130 selects one pool area 32 from among the plurality of pool areas 32 according to the size of the transmitted data, and allocates a storage area from within that provided by the physical/logical volumes 31 in the selected pool area 32 to the virtual/logical volume 33. This is one of the features of this embodiment, and the detailed procedures are explained later.

Figure 14:
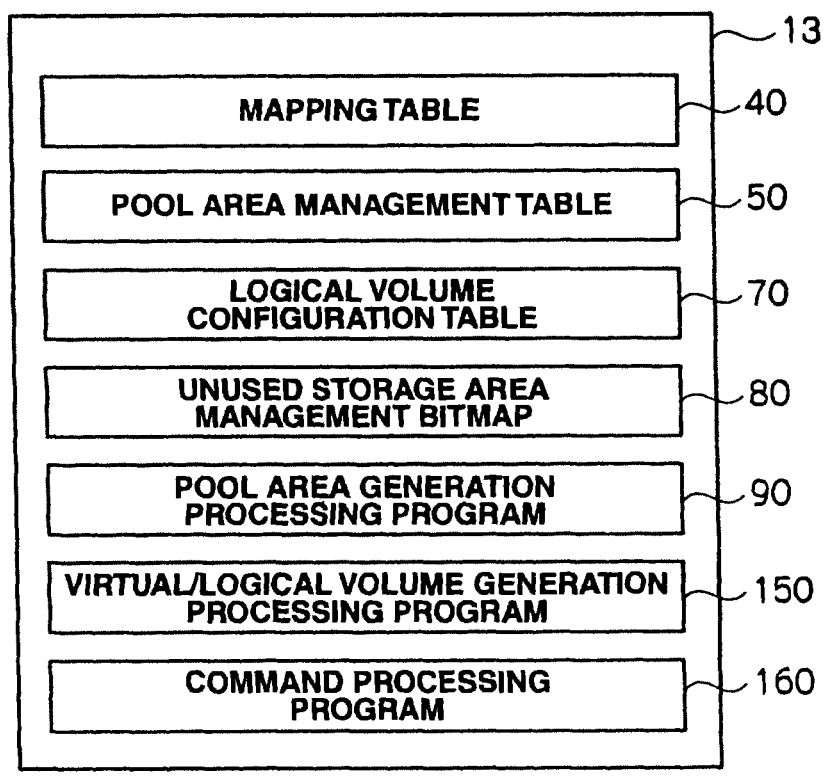
FIG. 14 is a schematic view for explaining various tables and programs in shared memory.

FIG. 14 shows various programs and tables that are stored in the shared memory 13 and related to the storage area allocation processing according to this embodiment. In this embodiment, the shared memory 13 stores: a mapping table 140; pool area management table 50; logical volume configuration table 70; unused storage area management bitmap 80; pool area generation processing program 90; virtual/logical volume generation processing program 150; and command processing program 160. Details of the virtual/logical volume generation processing program 150 and command processing program 160 are explained further below.

FIG. 15 shows the configuration of the mapping table 140. The mapping table 140 is prepared and managed for each virtual/logical volume 33, and holds the correlation between the virtual/logical volume 33 and the physical/logical volume(s) 31. This table is composed of: a virtual/logical volume address field 141; physical/logical volume identification number field 142; physical/logical volume address field 143; and allocation unit size field 144.

The virtual/logical volume address field 41 manages the address (for example, LBA) in the virtual/logical volume 33. The physical/logical volume identification number field 142 manages the identification number (for example, LUN) of a physical/logical volume 31 that has been associated with the above virtual/logical volume 33 address. The physical/logical volume address field 143 manages the starting address (for example, starting LBA) in the physical/logical volume 31, associated with the above virtual/logical volume 33 address. The allocation unit size field 144 manages the allocation unit size for allocating a storage area from within that provided by the physical/logical volumes 31 in the pool area 32 to a virtual/logical volume 33.

In FIG. 15, for example, the virtual/logical volume address "0" is associated with a storage area in the physical/logical volume 31 having a physical/logical volume identification number of "0x0007," and of an allocation unit size of "1 M" from the physical/logical volume starting address "0".

In the storage system 120, where one virtual/logical volume address area corresponds to, for example, a 256 KB data size, if a 1 MB data write request command is received from the host computer 2, the 1 MB data write is performed from the allocated physical/logical volume starting address with the allocated physical/logical volume identification number, and that data write is managed in the mapping table 140.

In an open-type computer system, data read/write is performed, for example, from the "n"th logical block, for "m" logical blocks (one logical block being 512 KB). So, if the storage system 120 is in an open-type computer system environment, when searching for an unused storage area, the storage system 120 searches for a storage area having a physical/logical volume starting address of "512×n" and an allocation unit size of "512×m," and then checks whether the physical/logical volume addresses included in that storage area are managed as "unused" or not.

In a mainframe-type computer system, data read/write is performed, for example, by designating the "m"th disk device 21 in the "n"th cylinder. So, if the storage system 120 is in a mainframe-type computer system environment, when searching for an unused storage area, the storage system 120 determines the target physical/logical volume starting address by aggregating all disk devices 21. More specifically, the storage system 120 checks whether the addresses following the starting address of "(n×15+m)×emulation-type-based size (48 KB for the 3380-type, and 57 KB for the 3390-type)" are managed as "unused" or not.

Figure 16:
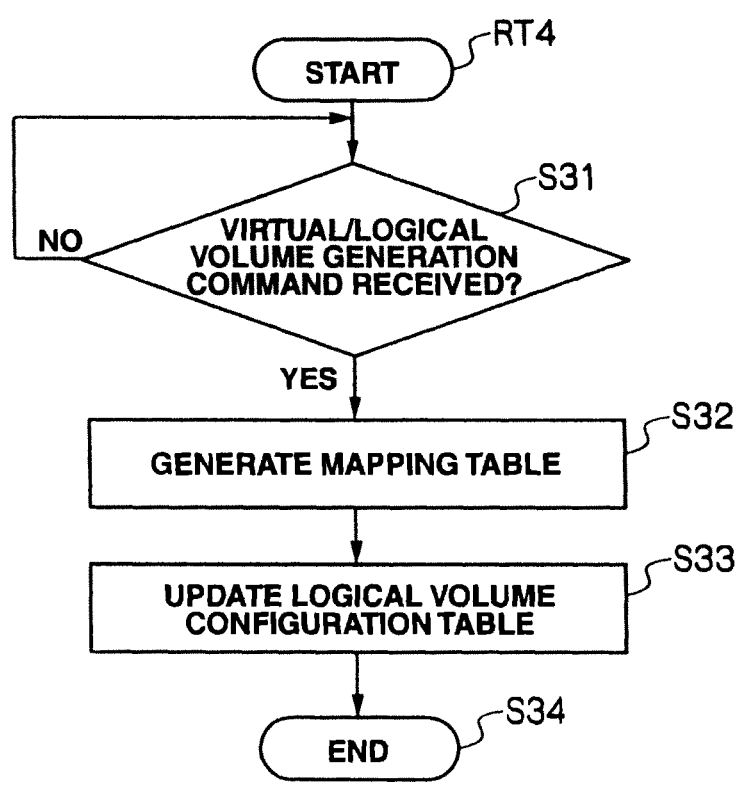
FIG. 16 is a flowchart for explaining virtual/logical volume generation processing.

Next, virtual/logical volume generation processing in the storage system 120 according to the second embodiment will be explained. FIG. 16 is a flowchart showing the specific procedure executed by the storage apparatus 130 for the virtual/logical volume generation processing in the storage system 120.

Upon system boot-up, a channel adapter 11 executes the virtual/logical volume generation processing program 150 for generating a virtual/logical volume 33, and, in accordance with the virtual/logical volume generation procedure RT4 shown in FIG. 16, waits in standby mode to receive a virtual/logical volume generation command via the management terminal 16 from a user at the user management terminal 19 (S31).

A virtual/logical volume generation command, for example, includes information such as: the virtual/logical volume identification number of a virtual/logical volume 33 to be generated; the virtual/logical volume size of the virtual/logical volume 33 to be generated; the connection port for connecting the virtual/logical volume 33 to be generated to the host computer 2; and the emulation type of the host computer 2 sending data to be stored in the virtual/logical volume 33 to be generated, all specified by a user.

When the channel adapter 11 receives a virtual/logical volume generation command via the management terminal 16 from a user at the user management terminal 19 (S31: YES), the channel adapter 11 generates a mapping table 40 in accordance with the pool area generation command received from the user management terminal 19 via the management terminal 16 (S32). More specifically, the channel adapter 11 generates a mapping table 140 for each generated virtual/logical volume 33, and in accordance with the virtual/logical volume generation command, stores the virtual/logical volume addresses corresponding to the virtual/logical volume size specified by the user, in the corresponding fields of the mapping table 140.

The channel adapter 11 then updates the logical volume configuration table 70 in accordance with the pool area generation command received from the user management terminal 19 via the management terminal 16 (S33). More specifically, in accordance with the virtual/logical volume generation command, the channel adapter 11 stores the virtual/logical volume identification number (logical volume identification number), virtual/logical volume size (logical volume size), connection port and emulation type, which have been specified by the user, in the corresponding fields of the logical volume configuration table 70.

The channel adapter 11 thereafter ends the virtual/logical volume generation procedure RT4 shown in FIG. 16 (S34).

Figure 17:
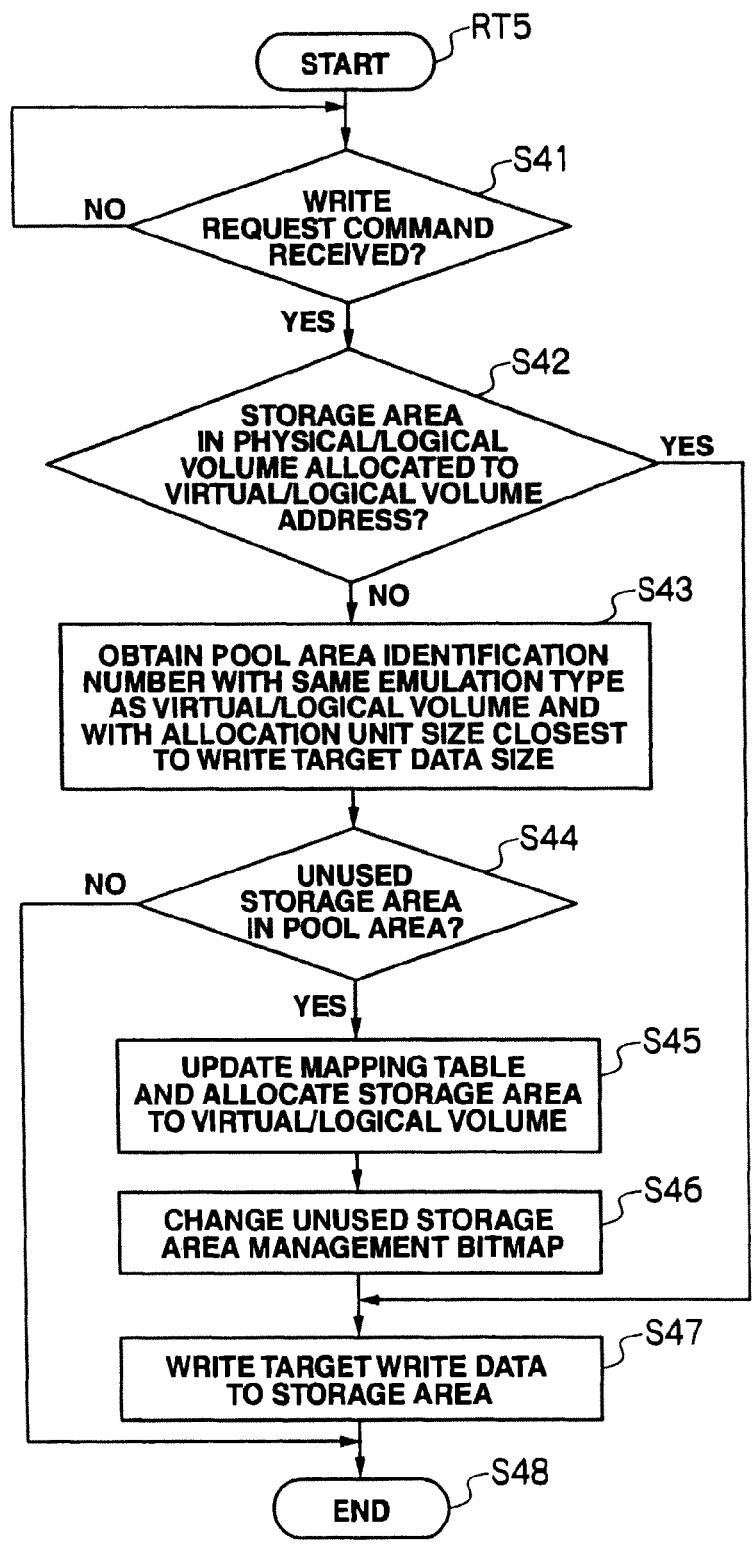
FIG. 17 is a flowchart for explaining command processing for data write.

Next, command processing in response to a data write request in the storage system 120 according to the second embodiment will be explained. FIG. 17 is a flowchart showing the specific procedure executed by the storage apparatus 130 for the command processing in response to a data write request in the storage system 120.

Upon system boot-up, a channel adapter 11 executes the command processing program 160 for writing data to a storage area in response to a data write request from the host computer 2, and in accordance with the data write request command procedure RT5 shown in FIG. 17, waits in standby mode to receive a data write request command from a user at the host computer 2 (S41).

When the channel adapter 11 receives a data write request command form a host computer 2 (S41: YES), the channel adapter 11 checks whether a storage area in a physical/logical volume 31 has been allocated to the virtual/logical volume address in the virtual/logical volume 33 (S42).

If no storage area in a physical/logical volume 31 has been allocated to the virtual/logical volume address in the virtual/logical volume 33 (S42: NO), the channel adapter 11 refers to the pool area management table 50 to obtain the pool area identification number that has the same emulation type as that of the virtual/logical volume 33 and also has the allocation unit size closest to the size of the write target data included in the data write request command (S43).

Accordingly, by using the pool area management table 50, the channel adapter 11 can select, from among the pool areas 32, one pool area holding a physical/logical volume 31 from which a storage area is to be allocated to the virtual/logical volume 33.

The channel adapter 11 then checks whether the physical/logical volumes 31 in the pool area 32 associated with the virtual/logical volume 33 have any unused storage areas or not (S44).

More specifically, the channel adapter 11 refers to the pool area management table 50, and checks whether any unused storage areas are stored in the relevant field associated with the above pool area's identification number.

If the physical/logical volumes 31 in the pool area 32 associated with the virtual/logical volume 33 have no unused storage area (S44: NO), the channel adapter 11 closes the physical/logical volumes 31 in that pool area 32, and then ends the data write request command procedure RT5 shown in FIG. 17 (S48).

Meanwhile, if the physical/logical volumes 31 in the pool area 32 associated with the virtual/logical volume 33 have any unused storage area (S44: YES), the channel adapter 11 updates the mapping table 140 and allocates a storage area from within that provided by the physical/logical volumes 31 n the pool area 32 associated with the virtual/logical volume 33 (S45).

More specifically, the channel adapter 11 refers to the unused storage area management bitmap 80 to determine the physical/logical volume starting address of a storage area to be allocated, and then refers to the mapping table 140 and updates it by storing the physical/logical volume identification number, the physical/logical volume starting address, and the allocation unit size of the storage area to be allocated in the physical/logical volume 31, respectively in the relevant fields associated with the target virtual/logical volume address in the mapping table 140.

In the above, the channel adapter 11 is configured to allocate, if several physical/logical volumes have unused storage areas, a storage area from within that provided by the physical/logical volume 31 having the largest unused storage areas.

The channel adapter 11 next changes the unused storage area management bitmap 80 in connection with the update of the mapping table 140 (S46). More specifically, the channel adapter 11 refers to the mapping table 140, and changes the unused storage area management bitmap 80 by changing the management status of the physical/logical volume address of the allocated storage area in the physical/logical volume 31 to "1" in the unused storage area management bitmap 80.

Meanwhile, if a storage area in a physical/logical volume 31 has already been allocated to the virtual/logical volume address in the virtual/logical volume 33 (S42: YES), or if the channel adapter 11 has allocated a storage area to the virtual/logical volume 33, updated the mapping table 140 and changed the unused storage area management bitmap 80 (S43 through S46), the channel adapter 11 writes the write target data in the storage area in the physical/logical volume 31, which is associated with the write target virtual/logical volume address (S47).

The channel adapter 11 thereafter ends the data write request command procedure RT5 shown in FIG. 17 (S48).

As explained above, in the storage system 120, a plurality of pool areas 32 is generated for holding physical/logical volumes 31, and an allocation unit size is set for each pool area 32, the allocation unit size being used for allocating a storage area from within that provided by the physical/logical volumes 31 in the pool area 32 to a virtual/logical volume 33. When data is transmitted from the host computer 2, one pool area 32 is selected from among the plurality of pool areas 32 according to the transmitted data size, and a storage area from within that provided by the physical/logical volumes 31 in the selected pool area 32 is allocated to the virtual/logical volume 33.

Accordingly, in the storage system 120, since one pool area 32 is selected from among the plurality of pool areas 32 according to the size of data sent from the host computer 2, a storage area of an appropriate allocation unit size can be allocated to each piece of the data, and as a result, more efficient operation of the physical/logical volume storage area can be achieved.

Figure 18:
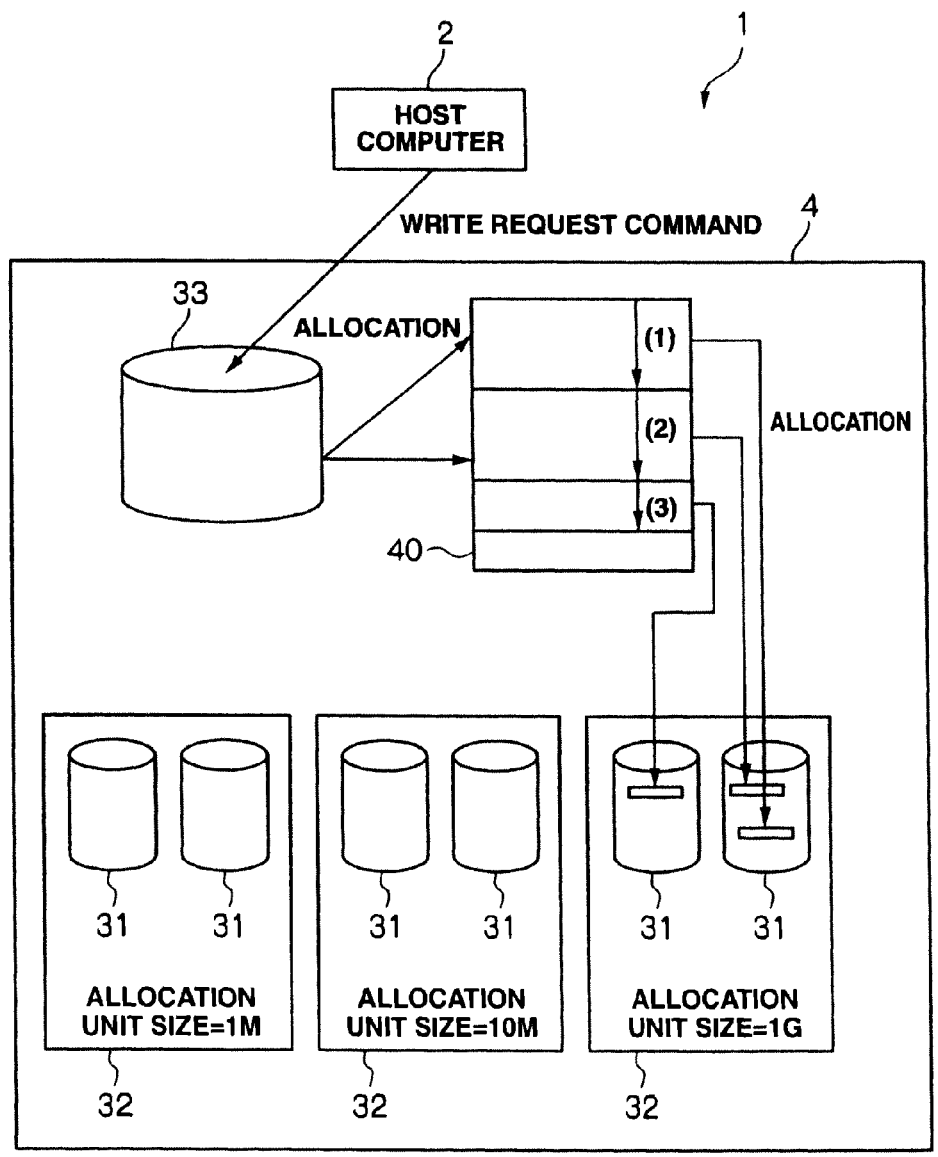
FIG. 18 is a schematic view briefly illustrating the content of allocation processing in a mainframe-type computer system.

If the above-described embodiments are in a mainframe-type computer system environment, logical volumes are used in order from the top logical volume address to the end address (i.e., sequentially, (1) (3)), as shown in FIG. 18. So, by setting a relatively large allocation unit size, for example, about 1 GB, the storage area in the physical/logical volumes can be more efficiently operated.

Figure 19:
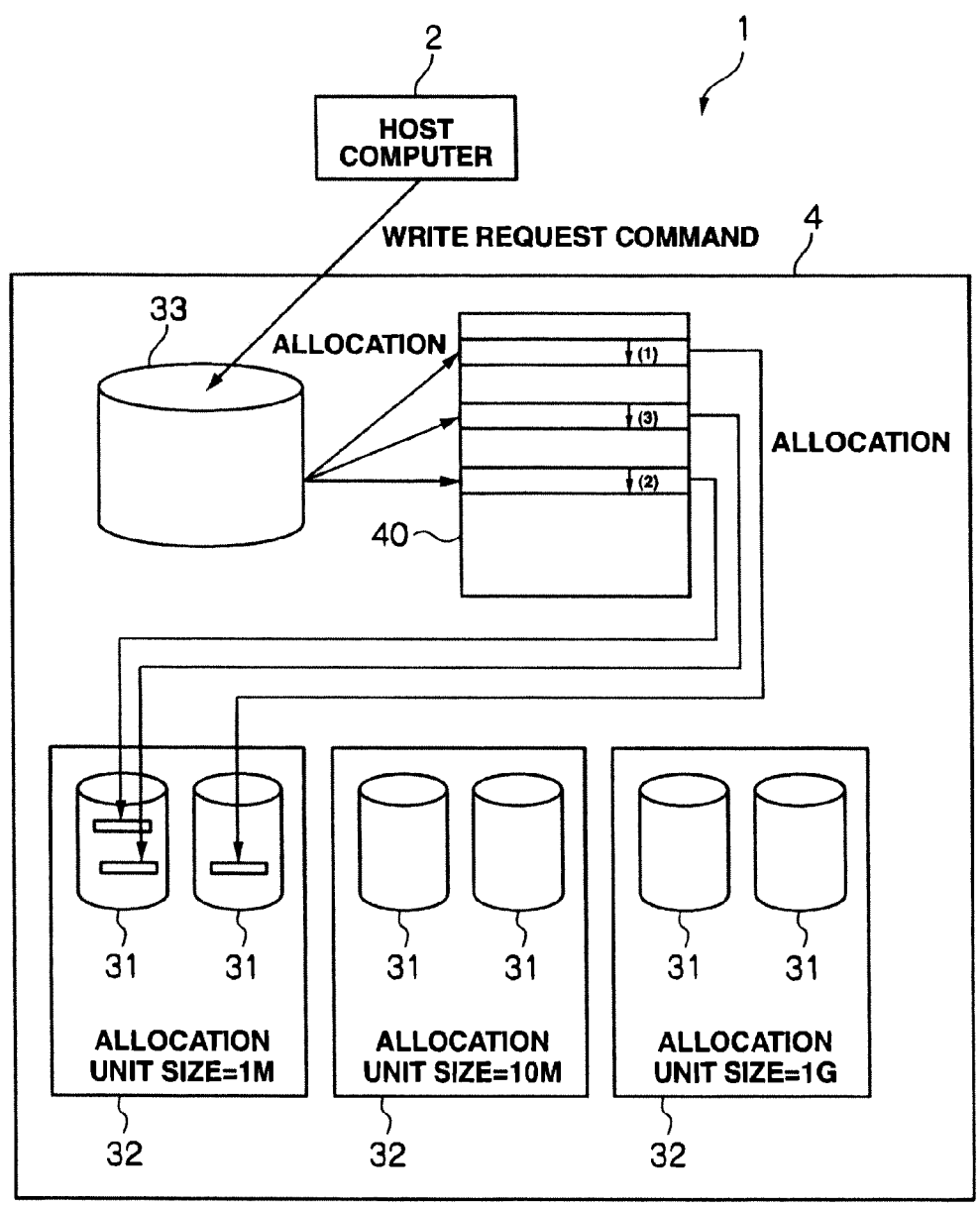
FIG. 19 is a schematic view briefly illustrating the content of allocation processing in an open-type computer system.

Also, if the above-described embodiments are in an open-type computer system environment, logical volumes is used by intentionally creating an unused storage area between used areas (i.e., randomly, (1) (3)), as shown in FIG. 19. So, by setting a relatively small allocation unit size, for example, around 1-10 MB, the storage area in the physical/logical volumes can be more efficiently operated.

Moreover, the above-described embodiments may be modified so that, instead of (the allocation unit size) being specified by a user, the storage apparatus automatically determines, based on a command sent from the host computer 2, whether the host computer 2 is a mainframe-type computer system or an open-type computer system, and if it is a mainframe-type computer system, automatically sets a relatively large allocation unit size, and if it is an open-type computer system, automatically sets a relatively small allocation unit size, enabling the storage area in the physical/logical volumes to be more efficiently operated.

Also, in the above-described embodiments, if SATA disks are used for disk drives 21 for backup purposes, the storage area in the physical/logical volumes can be more efficiently operated by setting a relatively large allocation unit size.

Furthermore, in the above-described embodiments, pool area generation commands and virtual/logical volume generation commands are sent via the management terminal 16 from a user at the user management terminal 19. However, this invention is not limited to that, and pool area generation commands and virtual/logical volume generation commands may be configured to be sent from the management terminal 16, or various other connection devices.

The present invention can be applied to various systems with a virtual/logical volume to which a dynamically variable storage area is allocated, the volume being provided to a host computer.

What is claimed is:

1. A storage system coupled to a host computer comprising:
   a plurality of storage devices which configures a plurality of logical units including a plurality of storage regions; and
   a controller configured to:
      provide a certain virtual volume including a plurality of virtual regions to the host computer;
      manage first storage regions of the plurality of storage regions and second storage regions of the plurality of storage regions, a size of the first storage region being different from size of the second storage region;
      determine which storage region is to be allocated to one of the plurality of virtual regions according to a size of data to be stored in the allocated storage region;
      allocate one of the first storage regions to a first virtual region of the certain virtual volume, the size of the first storage region being closer to a size of data to be stored in the first storage region than the size of the second storage region; and
      allocate one of the second storage regions to a second virtual region of the certain virtual volume, the size of the second storage region being closer to a size of data to be stored in the second storage region than size of first storage region.

2. The storage system according to claim 1, wherein the controller is configured to manage a plurality of virtual volumes including the certain virtual volume.

3. The storage system according to claim 1, wherein the controller is configured to:
allocate one of the first storage regions to the first virtual region in response to a first write request to the first virtual region; and
allocate one of the second storage regions to the second virtual region in response to a second write request to the second virtual region.

4. The storage system according to claim 3, wherein the controller is configured to:
store first data related to the first write request to the first storage region; and
store second data related to the second write request to the second storage region,
wherein size of the first data is larger than size of the second data, and the size of the first storage region is larger than the size of the second storage region.

5. The storage system according to claim 1, wherein size of data to be stored in the first storage region is closer to the size of the first storage region than to the size of the second storage region.

6. A storage system coupled to a host computer comprising:
a plurality of storage devices which configures a plurality of logical units including a plurality of storage regions; and
a controller configured to;
provide virtual volumes including a certain virtual volume to the host computer;
manage first storage regions of the plurality of storage regions and second storage regions of the plurality of storage regions, a size of the first storage region being different from size of the second storage region;
determine which storage region is to be allocated to one of the plurality of virtual regions according to a size of data to be stored in the allocated storage region;
allocate one of the first storage regions to the certain virtual volume in response to a first write request to the certain virtual volume, the size of the first storage region being closer to a size of data to be stored in the first storage region than the size of the second storage region;
store first data, related to the first write request, to the first storage region;
allocate one of the second storage regions to the certain virtual volume in response to a second write request to the certain virtual volume, the size of the second storage region being closer to a size of data to be stored in the second storage region than size of first storage region; and
store second data, related to the second write request, to the second storage region.

7. The storage system according to claim 6, wherein the controller is configured to manage the virtual volumes.

8. The storage system according to claim 6, wherein the controller is configured to:
allocate one of the first storage regions to a first virtual region of the certain virtual volume in response to a first write request to the first virtual region; and
allocate one of the second storage regions to a second virtual region of the certain virtual volume in response to a second write request to the second virtual region.

9. The storage system according to claim 6, wherein size of the first data is closer to the size of the first storage region than to the size of the second storage region.

10. The storage system according to claim 6, wherein size of the first data is larger than size of the second data, and the size of the first storage region is larger than the size of the second storage region.

11. A method of a storage system, wherein the storage system is coupled to a host computer and includes a plurality of storage devices which configures a plurality of logical units including a plurality of storage regions, the method comprising:
providing, by a controller, a certain virtual volume including a plurality of virtual regions to the host computer;
managing, by the controller, first storage regions of the plurality of storage regions and second storage regions of the plurality of storage regions, wherein a size of the first storage region different from size of the second storage region;
determining, by the controller, which storage region is to be allocated to one of the plurality of virtual regions according to a size of data to be stored in the allocated storage region;
allocating, by the controller, one of the first storage regions to a first virtual region of the certain virtual volume, wherein the size of the first storage region is closer to a size of data to be stored in the first storax e re on than the size of the second storage reion: and allocating, by the controller, one of the second storage regions to a second virtual region of the certain virtual volume, wherein the size of the second storage region is closer to a size of data to be stored in the second storage region than size of first storage region.

12. The method according to claim 11, further comprising:
managing, by the controller, a plurality of virtual volumes including the certain virtual volume.

13. The method according to claim 11, further comprising:
allocating, by the controller, one of the first storage regions to the first virtual region in response to a first write request to the first virtual region; and
allocating, by the controller, one of the second storage regions to the second virtual region in response to a second write request to the second virtual region.

14. The method according to claim 11, wherein size of data to be stored in the first storage region is closer to the size of the first storage region than to the size of the second storage region.

15. The method according to claim 13, further comprising:
storing, by the controller, first data related to the first write request to the first storage region; and
storing, by the controller, second data related to the second write request to the second storage region,
wherein size of the first data is larger than size of the second data, and the size of the first storage region is larger than the size of the second storage region.

* * * * *